United States Patent [19]

Simic et al.

[11] 4,001,148

[45] Jan. 4, 1977

[54] PROCESS FOR THE PRODUCTION OF FLAME-RESISTANT PHENOLIC RESIN FOAM PLASTICS

[75] Inventors: Dragomir Simic, Mulheim; Heinz-Ulrich Zupancic, Duisburg; Martin Cherubim, Rheinkamp-Eick, all of Germany

[73] Assignee: Deutsche Texaco Aktiengesellschaft, Germany

[22] Filed: Mar. 3, 1975

[21] Appl. No.: 554,899

[30] Foreign Application Priority Data

Mar. 21, 1974 Germany .......................... 2413567

[52] U.S. Cl. .......................... 260/2.5 F; 260/29.3; 260/33.4 R; 260/33.6 R; 260/33.8 R; 260/34.2; 106/15 FP
[51] Int. Cl.² .......................... C08J 9/14; C08J 9/16
[58] Field of Search .......... 260/2.5 F, 29.3, 33.4 R, 260/33.6 R, 33.8 R, 34.2; 106/15 FP

[56] References Cited
UNITED STATES PATENTS 3,779,955  12/1973  Wade ................................. 260/2.5

OTHER PUBLICATIONS

Benning, Plastic Foams I, pp. 424–429 (Wiley–Interscience, 1969).
Frisch et al., Plastic Foams I, part II, pp. 641–651, 668–673, (Marcel Dekker, 1973).
Chem. Abs. 66:P46779b.

Primary Examiner—Murray Tillman
Assistant Examiner—T. De Benedictis, Sr.
Attorney, Agent, or Firm—Thomas H. Whaley; Carl G. Ries; Walter D. Hunter

[57] ABSTRACT

Flame-resistant foam plastics are prepared by mixing with an aqueous alkaline condensed phenol-formaldehyde resin solution an expanding agent such as hexane and an acidic curing agent after which the mixture is foamed and permitted to cure. Useful acidic curing agents, comprise mixtures of a strong inorganic or organic acid, a glycol and phosphoric acid.

13 Claims, No Drawings

PROCESS FOR THE PRODUCTION OF FLAME-RESISTANT PHENOLIC RESIN FOAM PLASTICS

BACKGROUND OF THE INVENTION

1. Field of the Invention

The invention relates to a process for the production of phenolic resin foam plastics wherein an alkaline-condensed phenol-formaldehyde resin is mixed with an expanding agent and an acidic curing agent after which the said mixture is subjected to foaming and permitted to cure.

2. Description of the Prior Art

As is known, phenolic resin foam plastics burn when exposed to an open flame. In order to eliminate this major disadvantage various flame-retarding agents and substances are added to phenolic resin foam plastics to render them flame-resistant. Thus, German Offenlegungsschrift No. 1,669,833 recommends the addition of copolymers from silicones and glycol. Other well-known fire-retarding agents for phenolic resin foam plastics are nitrogen-containing compounds, such as urea, melamine and dicyandiamide.

In German Offenlegungsschrift No. 1,923,719 it is recommended to use such nitrogen-containing substances not in admixtures with the phenolic resin but in combination with the acidic catalyst. The nitrogen-containing compound is employed to form, with the acidic catalyst, an addition compound remaining stable in the acid medium.

The disadvantage of the conventional flame-resistance or flame-retarding phenolic resin foam plastics is that, compared to foam plastics of the same composition not containing the flame-retarding agent, they are mechanically less stable.

It is the object of this invention to provide a process permitting the production of phenolic resin foam plastics having outstanding flame-resistance and, at the same time, having the good mechanical stability typical for phenolic resin hard foam plastics.

SUMMARY OF THE INVENTION

This invention relates to a process for the production of flame-resistant phenolic resin foam plastics wherein an aqueous alkaline-condensed phenol-formaldehyde resin solution is mixed with an expanding agent and an acidic curing agent, the mixture is subjected to foaming at temperatures of about 15° to about 30° C and is permitted to cure. The curing agent utilized in the process of this invention has the following composition:

8–70 vol. % of a strong inorganic or organic acid,
10–40 vol. % of a glycol,
20–80 vol. % of an about 75 to about 85 wt. % phosphoric acid.

Preferably, the curing agent has the following composition:

10 vol. % of a 60 wt. %, phenolsulfonic acid,
20 vol. % ethylene glycol,
70 vol. % of an 85 wt. % phosphoric acid.

DETAILED DESCRIPTION OF THE INVENTION

In the process of the invention the curing composition is preferably used in an amount of 10–40 vol. % and preferably 15–30 vol. %, based on a phenolic resin solution having a solid matter content of about 65 to about 85 wt. %.

The combination of a strong inorganic or organic acid, phosphoric acid, and a glycol of this invention represents a new curing composition. Surprisingly, it was found that, if a combination comprising a strong inorganic or organic acid, phosphoric acid, and a glycol is added as the curing agent in the specified quantities, foaming takes place without any problem to yield foam plastics with a homogenous cellular structure. In addition, such foam plastics show surprisingly high flame-resistance without any loss in mechanical stability.

Inorganic acids, such as hydrochloric acid and sulfuric acid, aromatic sulfonic acids, phosphoric acid, and the like, as well as mixtures of these acids, have been used as acid curing agents. One of the most common acid curing agents is strong hydrochloric acid. If, however, these acids are employed alone, there are several disadvantages. For example, strong hydrochloric acid has the disadvantage that foam plastics produced with it are corrosive to metals. Although sulfonic acids do not show this corrosive effect to the same extent, they do not render foam plastics flame-resistant, while phosphoric acid, which is often incorporated into resins to make them flame-resistant, is either too slow or not efficient enough in the foaming of large quantities of materials, if it foams such quantities at all. A mixture of the above-mentioned acids and phosphoric acid, however, has the disadvantage that, with large foam blocks, local overheating may occur and the foam blocks may crack and burst. This also applies to the mixture of aromatic sulfonic acid and phosphoric acid without any other additions. If the phosphoric acid portion of the curing agent exceeds 80 vol. % shrinking and curing time of the foam becomes too long and the stability of the resulting foamed material is unsatisfactory.

Now, it has been found that well and evenly expanded and flame-resistant phenolic resin foam plastics having good mechanical stability and showing no cracks, may be obtained, if as curing agent a mixture of a strong inorganic or organic acid, phosphoric acid, and a glycol is added in the quantities specified above. An especially useful curing agent is a mixture comprising phenolsulfonic acid, ethylene glycol, and phosphoric acid in the above-mentioned volume percentages. It has been found that the glycol, especially ethylene glycol, component of the curing agent prevents the formation of cracks in large foam blocks. It is not yet possible to explain this effect of ethylene glycol and the other mentioned glycols.

As strong inorganic or organic acids sulfuric acid, hydrochloric acid, phenolsulfonic acid, toluenesulfonic acid, naphtholsulfonic acid, or other aromatic sulfonic acids may be employed. Of the sulfonic acids, phenolsulfonic acid is preferred, since it is most economical. The aromatic sulfonic acids may be used as an about 40 to 70 wt. % aqueous solution and phosphoric acid as commercially available 70 to 85 wt. % aqueous solution. Preferably, phenolsulfonic acid is used as an about 60 wt. % aqueous solution and phosphoric acid as commercially available 85 wt. %. Suitable glycols are ethylene glycol, propylene glycol and butylene glycol and isomers thereof, and polyalkylene glycols, such as polyethylene and polypropylene glycols having molecular weights of up to about 1000.

As phenolic resins, resoles may be used, i.e. alkaline-condensed phenol-formaldehyde resins, having a mole ratio of phenol to formaldehyde ranging from 1:1.1 to 1:2.0 and preferably ranging from 1:1.5 to 1:1.75. Useful alkaline catalysts include, for example, potassium hydroxide, sodium hydroxide, etc.

Apart from phenol-formaldehyde resins, also alkaline condensed resins of substituted phenols, namely cresol, xylenol or resorcinol or mixtures thereof with formaldehyde, may, likewise, be used in the same mole ratios as described above for the alkaline-condensed phenol-formaldehyde resins.

As expanding agents any of the known agents, e.g., pentane, hexane, heptane, trichlorofluoromethane, methylene chloride, may be employed.

Foaming of the mixtures containing the curing composition according to the invention may be conducted in open or closed molds or in a double belt press. The curing composition according to the invention is especially advantageous when used in foaming large blocks, i.e., blocks of approx. 1 cubic meter, since the risk of cracking is especially great with these dimensions.

After the foam plastic product of this invention has been prepared, it can be cured, if desired, in or out of the mold at a temperature of about 15° to about 30° C for about 1.5 to about 10 hours or more. Finally, the foam block product optionally can be tempered by heating the block in or out of the mold at a temperature of about 50° to about 90° C or more for about 6 to about 100 hours or more.

The following examples which illustrate various embodiments of this invention are to be considered not limitative.

In Examples 1 and 2, an aqueous phenol-formaldehyde resin solution was employed which was formed by condensing phenol and formaldehyde in a mole ratio of 1:1.64, with sodium hydroxide solution to a viscosity of 3,500 cps at a solids content of 73 wt. %. In Example 3, an aqueous phenol-formaldehyde resin solution of similar viscosity and solids content was employed, with the mole ratio of phenol to formaldehyde being about 1:1.52.

The curing composition (i.e., Curing Composition A) of the invention used in the Examples 1 to 3 had the following composition:
10 parts by volume phenolsulfonic acid, 60 wt. % (density 1.27 g/cm$^3$)
20 parts by volume ethylene glycol (density 1.13 g/cm$^3$)
70 parts by volume phosphoric acid, 85 wt. % (density 1.70 g/cm$^3$).

EXAMPLE 1

To 120 kg of phenol-formaldehyde resin (mole ratio 1:1.64) 2.8 vol. % of pentane and 25 vol. % of Curing Composition A were added under intensive stirring. This mixture was then poured into an open 1 m$^3$ mold at 20° C (cold foaming). After 1 minute the reaction mixture started to foam and after about 20 minutes foaming was ended. After being cured for approx. 60 minutes the finished foam block was removed from the mold. The resulting foam block had a density of 0.10 g/cm$^3$. After tempering (a heat treatment for 48 hours at 80° C) the foam block was cut into plates and these plates were tested for flame-resistance. The results are shown in Tables I and II.

EXAMPLE 2

In accordance with Example 1, 10 vol. % pentane and 25 vol. % Curing Composition A were added under stirring to 55 kg phenol-formaldehyde resin (mole ratio 1:1.64), and subjected to foaming in an open 1 m$^3$ mold at 20° C. After the foam had been cured for about 75 minutes, it was removed from the mold. The resulting foam block had a density of 0.04 g/cm$^3$. Like the foam of Example 1, it was tested for flame-resistance and the results obtained are shown in Tables I and II.

EXAMPLE 3

To 55 kg. of phenol-formaldehyde resin (mole ratio 1:1.52) 10 vol. % pentane and 25 vol. % of Curing Composition A were added under intensive stirring. The mixture was poured into an open 1 m$^3$ mold maintained at 60° C in a hot chamber (hot foaming) and foamed. In about 60 minutes foaming was completed and after being cured for 180 minutes the foam block was removed from the mold. The resulting foam block had a density of 0.04 g/cm$^3$. This foam block was then tested in the same manner as in Examples 1 and 2 and the results are reported in Tables I and II.

For determining flame-resistance two test methods were applied:

FLAME-RESISTANCE TEST (I) (LABORATORY METHOD)

Flame-resistance was tested by fastening a 4 cm-thick sample with a surface area of 25 × 25 cm, 10 cm above a Bunsen burner and exposing it to the flame until it was burnt through. All tested foam plastics of this invention exhibited the following characteristics: They burnt while exposed to the flame, but when removed burning ceased by itself.

FLAME-RESISTANCE TEST (II) (TECHNICAL METHOD)

Foam plates with measurements of 100 × 19 × 2.5 cm were hung in a fire pit and exposed to blazing from below. After 10 minutes blazing was ended and the samples were removed. The following criteria were evaluated:
height of flame
temperature of flue gas (must not exceed 250° C)
length of the non-destructed sample portion (must not be less than 15 cm).

The foam plastics obtained in Examples 1–3 were subjected to the above-described tests and, for comparison, foam plastics cured with hydrochloric acid-ethylene glycol and foam plastics cured by phenolsulfonic acid were tested in the same manner.

TABLE I

RESULTS OF FLAME-RESISTANCE TEST (I)

| | Density g/cm$^3$ | Time required for burning through-min. | Remarks |
| --- | --- | --- | --- |
| Comparative sample cured with hydrochloric acid-ethylene glycol | 0.04 | 3 | burning does not cease by itself |
| Comparative sample cured with phenolsulfonic acid | 0.04 | 8 | burning does not cease by itself |
| Example 1 | 0.10 | 150 | burning ceases by itself |
| Example 2 | 0.04 | 38 | burning ceases by itself |
| Example 3 | 0.04 | 42 | burning ceases by itself |

TABLE 2

RESULTS OF FLAME-RESISTANCE TEST (II)

| | Height of flame cm | Temp. of flue gas °C | Length of nondestructed sample portion cm |
|---|---|---|---|
| Comparative sample cured with hydrochloric acid-ethylene glycol | 100 | 270 | 0 |
| Comparative sample cured with phenol-sulfonic acid | 85 | 220 | 0 |
| Example 1 | 30 | 113 | 28 |
| Example 2 | 50 | 116 | 18 |
| Example 3 | 50 | 116 | 20 |

EXAMPLES 4 to 9

In the following Examples 4 to 9, an aqueous phenol-formaldehyde resin solution was employed which was formed by condensing phenol and formaldehyde in a mole ratio of 1:1.3 in the presence of caustic soda solution until a viscosity of about 4,500 cps was obtained. The solids contents of the aqueous phenolic resin solution was about 85 wt. %. After stirring in the pentane and the curing agent, the mixture was poured into an open box mold of 27 × 27 × 30 cm, foamed at approx. 20° C and then permitted to cure.

The attached Table III shows the quantities of expanding agent and curing agent employed in the various Examples and the composition of the curing agent used. Example 4 of this series was a comparative example in which the curing agent comprised hydrochloric acid and ethylene glycol.

Foam density and abrasion resistance of the obtained foam plastics were measured and the foam plastics were subjected to flame-resistance test (I). The test results are shown in Table III.

Abrasion resistance was determined by means of a testing machine (Testing machine 394 of Ra Fa Ma Company, Dusseldorf, West Germany). The rubbing surface of this machine had a diameter of 6 cm and weighed 4.3 kg. Abrasion resistance was measured after 30 strokes and expressed in millimeters.

TABLE III

RESULTS OF FLAME-RESISTANCE TEST (I) (LABORATORY)

| Example No. | 4* | 5 | 6 | 7 | 8 | 9 |
|---|---|---|---|---|---|---|
| Pentane Addition (vol.%) | 4.5 | 7.0 | 7.0 | 5.0 | 8.0 | 6.0 |
| Curing Agent Parts (vol.%) | 15 | 16 | 16 | 15 | 15 | 15 |
| COMPOSITION OF CURING AGENT IN VOL. % | | | | | | |
| $H_3PO_4$ (85 wt.%) | — | 43.7 | 43.7 | 20 | 80 | 30 |
| Phenol-sulfonic acid (60 wt.%) | — | 43.7 | 6.3 | 70 | 10 | 30 |
| HCl (37 wt.%) | 50 | — | 18.9 | — | — | — |
| Ethylene glycol | 50 | 12.6 | 31.1 | 10 | 10 | 40 |
| Foam density (g/cm³) | 0.035 | 0.043 | 0.041 | 0.044 | 0.044 | 0.038 |
| Abrasion (mm) | 6.1 | 2.5 | 2.7 | 2.6 | 2.2 | 3.4 |
| Burning-through time (min) | 2.5 | 6 | 6 | 5 | 16 | 5.5 |
| Burning ceases by itself | & no | & yes | & yes | & yes | & yes | & yes |

*Comparative Example

All foam plastics obtained according to the Examples of this invention were evenly foamed, i.e., they showed a homogenuous cellular structure and good mechanical stability.

What is claimed:

1. A process for the production of a flame-resistant, phenolic resin foam plastic which comprises:
   1. forming in aqueous solution an alkaline-condensed phenol-formaldehyde resin,
   2. mixing with the said resin solution an expanding agent and an acidic curing agent, and
   3. subjecting the mixture to foaming at a temperature of about 15° to about 80° C to form the foam plastic, and wherein the said acidic curing agent is a mixture comprising:
      a. 8 to 70 percent by volume of an aromatic sulfonic acid,
      b. 10 to 40 percent by volume of a glycol, and
      c. 20 to 80 percent by volume of an about 75 to 85 weight percent phosphoric acid.

2. The process of claim 1 wherein after step (3) the foam plastic is cured by maintaining it at a temperature of about 15 to about 30° C for about 0.5 to about 10 hours.

3. The process of claim 1 wherein the volume of the said acidic curing agent employed is from 10 to 40 percent based on the volume of the said phenolic formaldehyde resin solution having a solids contents of about 65 to about 85 weight percent.

4. The process of claim 1 wherein the volume of the said acidic curing agent employed is from 15 to 30 percent based on the volume of the said phenol-formaldehyde resin solution having a solids content of about 65 to about 85 weight percent.

5. The process of claim 1 wherein the said foam plastic is cured in an atmosphere of air at a temperature of about 40° to about 80° C for about 2 to about 24 hours.

6. The process of claim 1 wherein the said alkaline-condensed phenol-formaldehyde resin is formed by condensing a phenolic compound selected from the group consisting of phenol, cresol, xylenol, resorcinol and mixtures thereof with formaldehyde in the presence of an alkaline catalyst.

7. The process of claim 1 wherein the said alkaline-condensed phenol-formaldehyde resin is formed by condensing phenol and formaldehyde in the presence of an alkaline catalyst.

8. The process of claim 1 wherein the mole ratio of the said phenolic compound condensed with formaldehyde is about 1:1.1 to about 1:2.0.

9. The process of claim 1 wherein the said glycol in the acidic curing agent mixture is selected from the group consisting of (a) ethylene glycol, propylene glycol, butylene glycol and isomers thereof and polyalkylene glycols having molecular weights of up to about 1000.

10. The process of claim 1 wherein the said glycol in the acidic curing agent mixture is ethylene glycol.

11. The process of claim 1 wherein in the said acidic mixture the strength of the phosphoric acid is 85 weight percent.

12. The process of claim 1 wherein the said expanding agent is selected from the group consisting of pentane, hexane, heptane, trichlofluoromethane and methylene chloride.

13. The process of claim 1 wherein the said acidic curing agent is a mixture comprising:
 a. about 10 percent by volume of a 60 percent by weight of phenolsulfonic acid,
 b. about 20 percent by volume of ethylene glycol, and
 c. about 70 percent by volume of 85 percent by weight phosphoric acid.

* * * * *